(12) United States Patent
Lee et al.

(10) Patent No.: US 9,098,088 B2
(45) Date of Patent: Aug. 4, 2015

(54) METHOD FOR BUILDING OUTDOOR MAP FOR MOVING OBJECT AND APPARATUS THEREOF

(75) Inventors: Yu Cheol Lee, Incheon (KR); Jae Yeong Lee, Daejeon (KR); Won Pil Yu, Ulsan (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 356 days.

(21) Appl. No.: 13/335,871

(22) Filed: Dec. 22, 2011

(65) Prior Publication Data

US 2012/0163662 A1 Jun. 28, 2012

(30) Foreign Application Priority Data

Dec. 22, 2010 (KR) ........................ 10-2010-0132781

(51) Int. Cl.
G06K 9/00 (2006.01)
G05D 1/02 (2006.01)
G09B 29/10 (2006.01)

(52) U.S. Cl.
CPC ............ *G05D 1/0278* (2013.01); *G05D 1/0274* (2013.01); *G06K 9/00651* (2013.01); *G06K 9/00697* (2013.01); *G09B 29/10* (2013.01); *G05D 2201/0213* (2013.01)

(58) Field of Classification Search
None
See application file for complete search history.

(56) References Cited

U.S. PATENT DOCUMENTS

| 2008/0133554 | A1* | 6/2008 | Lee et al. | 707/100 |
| 2010/0086174 | A1* | 4/2010 | Kmiecik et al. | 382/103 |
| 2010/0118116 | A1* | 5/2010 | Tomasz et al. | 348/36 |
| 2010/0121886 | A1* | 5/2010 | Koshiba et al. | 707/803 |
| 2010/0235032 | A1 | 9/2010 | Sung et al. | |
| 2010/0266161 | A1* | 10/2010 | Kmiecik et al. | 382/103 |
| 2012/0065811 | A1* | 3/2012 | Nakamura et al. | 701/1 |
| 2012/0095682 | A1* | 4/2012 | Wilson | 701/532 |

FOREIGN PATENT DOCUMENTS

| JP | 2009515226 A | 4/2009 |
| KR | 1020100007310 | 1/2010 |
| KR | 1020100077727 | 7/2010 |

OTHER PUBLICATIONS

Chang et al.—Estimation of Subpixel Target Size for Remotely Sensed Imagery, IEEE, Jun. 2004, pp. 1309-1320.*

* cited by examiner

*Primary Examiner* — Matthew Bella
*Assistant Examiner* — Weiwen Yang
(74) *Attorney, Agent, or Firm* — Nelson Mullins Riley & Scarborough LLP; Anthony A. Laurentano, Esq.

(57) ABSTRACT

The method for building an outdoor map for a moving object according to an exemplary embodiment of the present invention includes: receiving a real satellite image for an outdoor space to which the moving object is to move; calculating pixel information including sizes of length and width pixels and a physical distance of one pixel in the real satellite image; measuring a reference position coordinate for a reference position selected from the real satellite image; and linking a pixel number corresponding to the reference position, the reference position coordinate, and the pixel information to the real satellite image in order to build the outdoor map for the moving object, and further includes creating information on a road network in which the moving object navigates based on the pixel number corresponding to the reference position, the reference position coordinate, and the pixel information.

15 Claims, 8 Drawing Sheets

FIG.4

| SIZES OF LENGTH AND WIDTH PIXELS |
|---|
| PHYSICAL SIZE OF ONE PIXEL |
| PIXEL NUMBER CORRESPONDING TO REFERENCE POSITION |
| REFERENCE POSITION COORDINATE FOR REFERENCE POSITION |

FIG.6

| NODE INFORMATION IDENTIFIER (ID) |
| --- |
| CONNECTION INFORMATION BETWEEN NODES |
| ATTRIBUTE OF ROAD TO WHICH NODE PERTAINS |

METHOD FOR BUILDING OUTDOOR MAP FOR MOVING OBJECT AND APPARATUS THEREOF

CROSS-REFERENCE TO RELATED APPLICATIONS

This application claims priority to and the benefit of Korean Patent Application No. 10-2010-0132781 filed in the Korean Intellectual Property Office on Dec. 22, 2010, the entire contents of which are incorporated herein by reference.

TECHNICAL FIELD

The present invention relates to an outdoor map creation for a moving object, and more particularly, to a method for building an outdoor map for a moving object capable of accurately building map information at low cost so as to enable moving objects such as a robot to stably travel outdoor, and an apparatus thereof.

BACKGROUND

A technology of travelling a moving object such as a robot is to develop ability of stably travelling the moving object to a desired destination while autonomously adapting to any environment. Recently, the technology for travelling the moving object may be mainly divided into a position estimation technology and a map creating technology. The position estimation technology is a technology capable of applying for a person as well as a moving object. Therefore, numerous researches into the position estimation technology have been conducted.

Particularly, a global positioning system (GPS) based position estimation technology in an outdoor environment has been dominantly used in various moving object travelling technologies. A navigation device informing a user of a travel route at the time of driving of a car may be mounted and used in most of cars due to the development of GPS technology. In the case of a normal GPS system, there is an error of several meters in accuracy. Even though a high cost differential GPS system has an error within several centimeters, it has a difficulty in being widely used due to the high cost.

Therefore, in the technology for travelling the moving object such as a robot, autonomously travelling of the moving object only by the GPS position estimation system having the error over several meters is significantly dangerous because the moving object may impact on a surrounding pedestrians.

In the case of a car navigation device, a person drives a car while directly seeing a generated route. That is, a person having superior estimation ability and inference ability as compared to an existing moving object such as a robot drives the car, such that the person can quickly react to a dangerous situation. On the other hand, it is very difficult to allow the moving object such as the robot to autonomously travel on the road only by the position estimation system having an error over several meters.

Therefore, a laser scanner, an image estimation camera, and the like, have been generally used together with the GPS position estimation system. However, since the laser scanner and the image camera additionally mounted on the moving object such as the robot are very expensive, in view of cost, it find it hard to widely use the moving object including the laser scanner and the image camera for the life of the human.

The demand for a method for allowing the moving object such as the robot to accurately measure a position even outdoors by combining a cheap image estimation camera with map information without using an expensive sensor in consideration of cost has increased. In the technology of travelling the moving object, a map may also be used as an important medium for current position identification, destination transfer, or the like, between the user and the moving object.

Therefore, a need exists for a technology of accurately building a map for outdoor navigation of a moving object such as a robot, that is, information required for navigation of the moving object such as the robot at a minimum cost.

SUMMARY

The present invention has been made in an effort to provide a method for building an outdoor map for a moving object, capable of improving accuracy while reducing a cost in construction of a map allowing the moving object such as a robot to stably travel outdoor, and an apparatus thereof.

Furthermore, the present invention has been made in an effort to provide a method for building an outdoor map for a moving object, capable of solving problems generated due to a GPS error of the moving object by building a map used for a moving object navigation using the GPS included in the moving object, and an apparatus thereof.

An exemplary embodiment of the present invention provides a method for building an outdoor map for a moving object, the method including: receiving a real satellite image for an outdoor space to which the moving object is to move; calculating pixel information including sizes of length and width pixels and a physical distance of one pixel in the real satellite image; measuring a reference position coordinate for a reference position selected from the real satellite image; and matching a pixel number corresponding to the reference position, the reference position coordinate, and the pixel information to the real satellite image in order to create the outdoor map for the moving object.

The method may further include creating information on a road network in which the moving object travels based on the pixel number corresponding to the reference position, the reference position coordinate, and the pixel information.

The measuring may include measuring the reference position coordinates using a GPS included in the moving object in a real position corresponding to the reference position.

The mapping process may include: setting a plurality of nodes for creating the road network; setting a connection relationship between the plurality of set nodes; extracting road attribute information on each of the plurality of nodes; and linking information set or extracted for the plurality of nodes to the real satellite image.

The receiving may include receiving the real satellite image converted into a raster image form or receiving a real satellite photograph, converting the real satellite photograph into the real satellite image in the raster image form, and providing the converted real satellite image, in order to reduce a data size of the constructed outdoor map.

The calculating may include calculating the physical distance of one pixel using accumulation of the real satellite image and the sizes of the length and width pixels or calculating the physical distance of one pixel using physical distance information between two preselected points on the real satellite image and the number of pixels between the two points.

Another exemplary embodiment of the present invention provides an apparatus for building an outdoor map for a moving object, the apparatus including: an image receiving unit receiving a real satellite image for an outdoor space to which the moving object is to move; a pixel information calculating unit calculating pixel information including sizes of length and width pixels and a physical distance of one pixel in the real satellite image; a reference position measuring unit measuring a reference position coordinate for a reference position selected from the real satellite image; and a link unit matching a pixel number corresponding to the reference position, the reference position coordinate, and the pixel information to the real satellite image in order to create the outdoor map for the moving object.

According to the exemplary embodiments of the present invention, an existing map infrastructure such as GIS is used in building the map through which the moving object such as a robot navigation, thereby making it possible to build an outdoor map for a moving object having high accuracy at a low cost.

Furthermore, according to the exemplary embodiments of the present invention, the outdoor map including the information capable of using in position estimation and the road network information capable of generating an optimal path is constructed and is provided to the moving object, thereby making it possible to allow the moving object to more stably and rapidly navigation.

In addition, according to the exemplary embodiments of the present invention, since the position may be accurately estimated in the moving object, it is not required to use an expensive laser scanner that has been mounted on the moving object in order to accurately estimate the position according to the related art, and significant effect may be expected in view of cost and stability in implementing a user embarking type moving object, or the like.

BRIEF DESCRIPTION OF THE DRAWINGS

FIG. 4 is a diagram showing an example of information calculated and measured by a pixel information calculating unit and a reference position measuring unit of FIG. 1 to be linked to a real satellite image.

FIG. 6 is a diagram showing an example of information set and measured by a road network information creating unit shown in FIG. 1 to be linked to a real satellite image.

DETAILED DESCRIPTION

Figure 1:
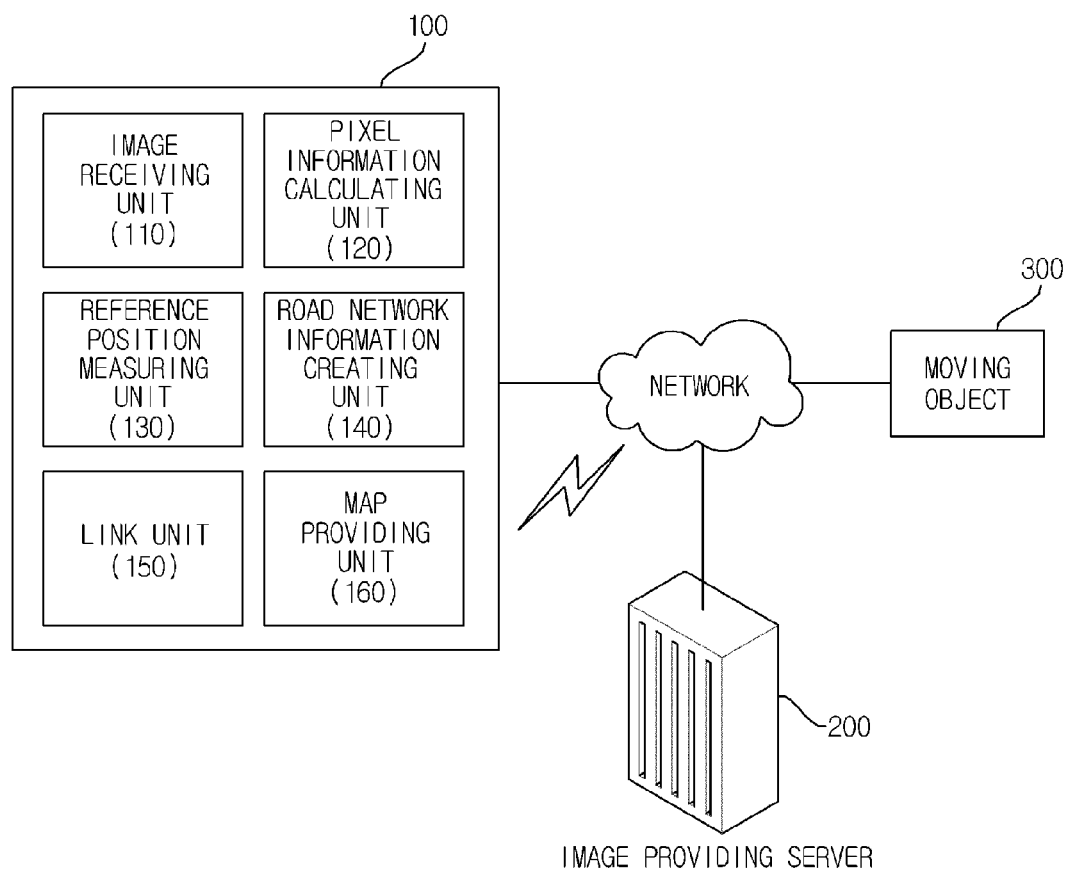
FIG. 1 is a diagram showing a configuration of a system for describing an apparatus for building an outdoor map for a moving object according to an exemplary embodiment of the present invention.

Various advantages and features of the present invention and methods accomplishing thereof will become apparent from the following description of embodiments with reference to the accompanying drawings. The present invention may, however, be embodied in many different forms without being limited to the embodiments set forth herein. However, the exemplary embodiments of the present invention will be described in detail so that a person with ordinary skilled in the art to which the present invention pertains may easily perform the technical ideas of the present invention.

In the drawings, the exemplary embodiments of the present invention are not limited to a specific form shown and are exaggerated in order to obtain clarity. Further, like reference numerals denote like components throughout the specification.

Hereinafter, a method for building an outdoor map for a moving object according to an exemplary embodiment of the present invention and an apparatus thereof will be described in detail with reference to FIGS. 1 to 8.

FIG. 1 is a diagram showing a configuration of a system for describing an apparatus for building an outdoor map for a moving object according to an exemplary embodiment of the present invention.

Referring to FIG. 1, a system includes an apparatus 100 for building an outdoor map according to the exemplary embodiment of the present invention, an image providing server 200, and a moving object 300.

The moving object 300, which is a component for more accurately and stably navigating outdoor using an outdoor map constructed by the apparatus for building an outdoor map according to the exemplary embodiment of the present invention, may be, for example, a robot.

In this case, the moving object 300 may include a GPS mounted therein and safely travel to a desired destination using position coordinate information measured by the mounted GPS and information included in the outdoor map constructed according to the exemplary embodiment of the present invention, for example, position coordinate information on a reference position, a physical distance of one pixel, information on a road network, and the like.

The image providing server 200, which is a server providing a real satellite image for building the outdoor map in the apparatus 100 according to the exemplary embodiment of the present invention, indicates an existing built server providing a real satellite image.

For example, the image providing server 200 may be a Google Mapserver providing the real satellite image.

The image providing server 200 may provide the real satellite image itself to the apparatus for building an outdoor map according to the exemplary embodiment of the present invention. However, since it is not appropriate in view of communication load or used data amount to use all of global real satellite images as map information in the working area of the moving object, the image providing server 200 may also convert a real satellite photograph for a space to which the moving object travels into a raster image form having a file format such as Bitmap, JPEG, Png, or the like, and then provide the converted image form to the apparatus for building an outdoor map according to the exemplary embodiment of the present invention.

The apparatus 100 for building an outdoor map, which is an apparatus for to build an outdoor map for a moving object using the real satellite image acquired from the image providing server 200, includes an image receiving unit 110, a pixel information calculating unit 120, a reference position measuring unit 130, a road network information creating unit 140, a link unit 150, and a map providing unit 160.

The image receiving unit 110 is a component receiving a real satellite image of a preset region from the image providing server 200 in order to build the outdoor map for the moving object.

In this case, the image receiving unit 110 may receive a real satellite image corresponding region for building an outdoor map by requesting the image providing server 200. The received real satellite image may be real satellite image itself or a real satellite image converted into a raster image form.

When the image receiving unit 110 receives the real satellite image itself from the image providing server 200, it may convert the real satellite image into the raster image form and use the converted raster image form.

According to the exemplary embodiment of the present invention, both of a case in which the image receiving unit 110 receives the real satellite image in the converted raster image form from the image providing server 200 and a case in which the image receiving unit 110 converts the real satellite image itself into the real satellite image in the raster image form may be used.

Figure 2:
FIG. 2 is a diagram showing an example of a real satellite image in a raster image form provided from an image receiving unit of FIG. 1.

The pixel information calculating unit 120 calculates pixel information including sizes of length and width pixels in a real satellite image and a physical distance of one pixel in the real satellite image using a real satellite image for building an outdoor map, for example, a real satellite image of a specific region for building an outdoor map as an example shown in FIG. 2.

In this case, the pixel information calculating unit 120 may calculate the physical distance of one pixel using the sizes of the length and width pixels and scale of the real satellite image included in the real satellite image provided from the image receiving unit 110.

For example, the pixel information calculating unit 120 may calculate a real distance of one pixel, that is, a physical distance, using the number of pixels included in a predetermined length on an image and the number of pixels and a real length corresponding to the predetermined length on the image through scale of the image. As an example, the pixel information calculating unit 120 may calculate the real distance of one pixel using the number of pixels included in 1 [m] on the image.

The pixel information calculating unit 120 may also calculate the physical distance of one pixel using physical distance information between two preselected points on the real satellite image and the number of pixels between two points.

For example, the pixel information calculating unit 120 may calculate the physical distance of one pixel by receiving two points on the real satellite image and distance information actually measured between two points from a map builder and using the received real distance information between two points and the number of pixels between two points on the real satellite image.

According to the exemplary embodiment of the present invention, the physical distance of one pixel calculated by the pixel information calculating unit 120 may be a metric unit.

The reference position measuring unit 130, which is a component measuring coordinate information on a reference position for extracting information required at the time of navigation of the moving object from the real satellite image, measures a reference position coordinate for a preselected reference position, for example, a longitude and latitude coordinate among positions included in the real satellite image.

Figure 3:
FIG. 3 is a diagram showing an example of a reference position selected or preset on a real satellite image by a map builder.

In this case, the reference position measuring unit 130 measures the coordinate information on the reference position selected on the real satellite image by the map builder as an example shown in FIG. 3, and may measure the reference position coordinate using a GPS mounted on the moving object using the outdoor map constructed according to the exemplary embodiment of the present invention.

That is, when a first GPS is mounted on the moving object to travel while using the outdoor map according to the exemplary embodiment of the present invention, the reference position measuring unit 130 may measure the coordinate information on the reference position using the first GPS, and when a second GPS is mounted on the moving object to travel, the reference position measuring unit 130 may measure the coordinate information on the reference position using the second GPS.

The reason is that there is a difference from at least several meters to at most several tens of meters in longitudes and latitudes measured per GPS. Therefore, according to the exemplary embodiment of the present invention, the reference position coordinate is measured using the same GPS mounted on the moving object, thereby making it possible to maximally reduce the difference between the longitudes and latitudes generated according to kinds of GPS sensors.

The reference position measuring unit 130 may also extract the reference position coordinate for the selected reference position by previously measuring and storing the reference position coordinates for at least one preset reference positions using various GPS sensors capable of being mounted on the moving object and then selecting a reference position and GPS information on the real satellite image in a state in which the reference position coordinates are previously stored.

In this case, which corresponds to a case in which various kinds of GPS sensors may be mounted on the moving object, the reference position coordinates are measured in the reference positions preselected for a specific region or each of region using various GPS sensors and the measured data is previously stored, thereby making is possible to rapidly build the outdoor map that may be applied for navigation of the moving object.

The reference position coordinate measured by the reference position measuring unit 130 is used as a reference value for the moving object to navigate while using the outdoor map. The constructed outdoor map includes the reference position coordinate and a pixel number for the reference position stored together therein, such that it may be used as the reference value.

The information calculated and measured by the pixel information calculating unit 120 and the reference position measuring unit 130 may be provided together with the real satellite image to the moving object in a state in which the sizes of the length and width pixels of the real satellite image, the physical distance (metric unit) of one pixel, the pixel number corresponding to the reference position, and the reference position coordinate for the reference position are arranged in a predetermined format, as shown in FIG. 4. This information may show a position of the robot in metric unit on the real satellite image together with the national marine electronics association (NMEA) information measured in real time from the GPS previously mounted on the moving object. That is, metric coordinates based on the set reference position and WGS84 longitude and latitude coordinates to be measured in the GPS may be known even at any point on the real satellite image, and an encoder, a gyro, an inertial measurement unit (IMU), and the like, which are a relative position measurement system mainly used in the moving object, may provide the metric coordinates and accurately match the WGS84 longitude and latitude coordinates of the GPS, such that this information may be used as good information in operating several position measuring systems in a combined scheme in order to implement a moving object position measuring technology.

The road network information creating unit 140, which is a component creating information on a road network in which the moving object actually travels, creates the information on the road network in which the moving object travels based on the pixel number corresponding to the reference position, the reference position coordinate, and the pixel information calculated by the pixel information calculating unit 120.

Figure 5:
FIG. 5 is a diagram showing an example of nodes and a road on a real satellite image set by a road network information creating unit of FIG. 1.

The road network information creating unit 140 sets a plurality of nodes for creating a road network selected on the real satellite image by the map builder, sets a connection relationship between the plurality of set nodes, and extracts road attribute information on each of the plurality of set nodes, as an example shown in FIG. 5, wherein the plurality of nodes may be selected directly by the map builder, and the connection relationship between the plurality of nodes is associated with information on the nodes capable of being connected to a corresponding node and may be set using the reference position coordinate and the pixel information.

In this case, the road attribute information may include a kind of pavement, a width of a road lane, and a kind of road lane. The kind and width of road lane may be extracted directly from the real satellite image. The kind and width of road lane extracted as described above are used together with the GPS measuring position information in estimating the position of the moving object, thereby making it possible to allow the moving object to more stable navigation.

The information set and extracted by the road network information creating unit 140 may be provided together with the real satellite image to the moving object in a state in which a node information identifier (ID), connection information between nodes, and an attribute of a road including a node are arranged in a predetermined format as shown in FIG. 6.

In this case, the node information identifier (ID) may be set at the time of setting the nodes, and the moving object may accurately and stably move using both of the information of FIG. 6 and the information of FIG. 4.

The link unit 150, which is a component linking the real satellite image in the raster image form to the information of FIG. 4 and the information of FIG. 6, links the pixel information of the real satellite image, the pixel number and the reference position coordinate for the reference position, and the information on the road network to the real satellite image so that the moving object may stably travel using the real satellite image.

The map providing unit 160 provides the outdoor map linked by the link unit 150 to a corresponding moving object. That is, the map providing unit 160 searches for an outdoor map corresponding to certain region and GPS among various outdoor maps according to various regions and GPS sensors constructed by the apparatus 100 for building an outdoor map and provides the searched map to the moving object that has requested the map.

As described above, the apparatus for building an outdoor map for a moving object according to the exemplary embodiment of the present invention receives the real satellite image from an existing map infrastructure and builds the outdoor map using the received real satellite image, and the coordinate information on the reference position on the real satellite image, and more specifically, the information on the physical distance of one pixel, and much more specifically, the information on the road network, thereby making it possible to create a stable and reliable outdoor map for a moving object at a low cost.

In addition, according to the exemplary embodiment of the present invention, since a cheap and accurate outdoor map is provided, it is not required to configure an additional apparatus required for accurately estimating a position in the moving object. Therefore, mapping cost of the moving object may also be reduced.

Figure 7:
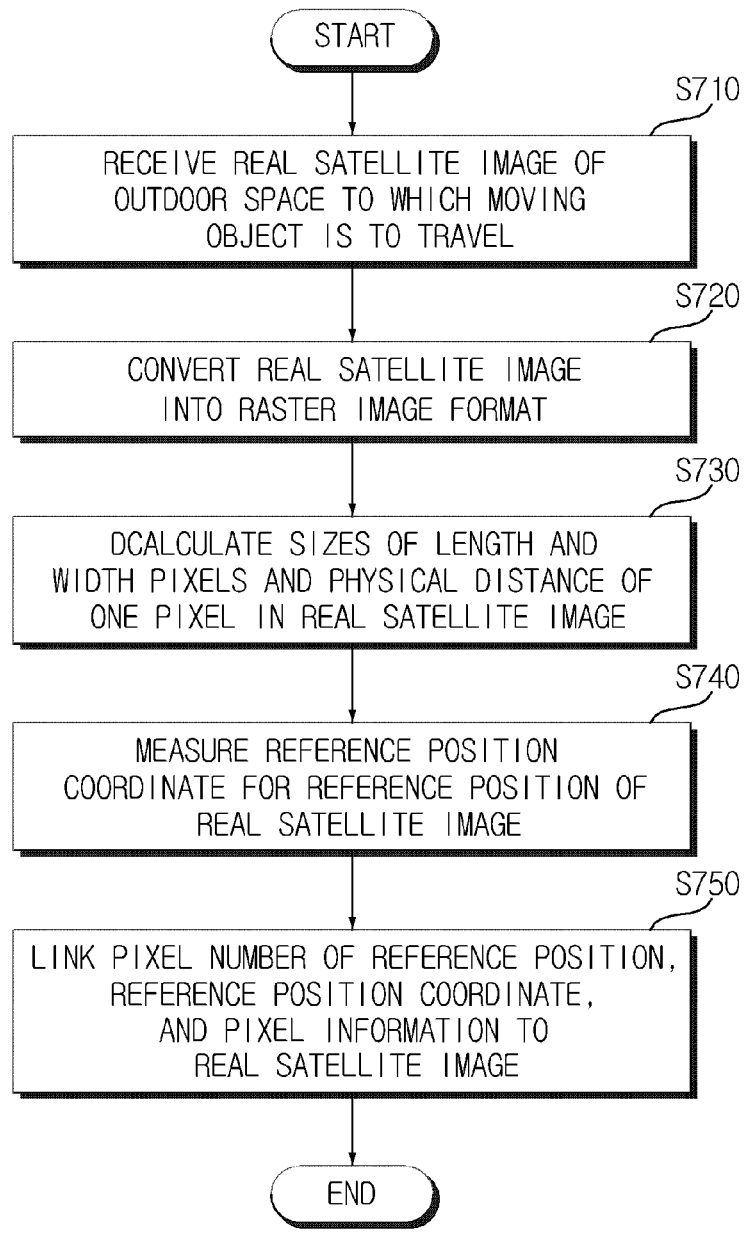
FIG. 7 is an operation flow chart showing a method for building an outdoor map for a moving object according to an exemplary embodiment of the present invention.

FIG. 7 is an operation flow chart of a method for building an outdoor map for a moving object according to an exemplary embodiment of the present invention.

Referring to FIG. 7, in a method for building an outdoor map for a moving object, a real satellite image of an outdoor space or an outdoor region to which a moving object is to navigate is received from a server providing a real satellite image (S710).

When the real satellite image is received, the received real satellite image is converted into a raster image format (S720).

In this case, a process of converting the real satellite image into the raster image format may be performed in the apparatus for building an outdoor map for a moving object according to the exemplary embodiment of the present invention shown in FIG. 1. Alternately, the real satellite image may also be converted into the raster image format in the server providing the real satellite image and then provided to the apparatus for building an outdoor map.

Sizes of length and width pixels and a physical distance of one pixel in the real satellite image converted into the raster image format are calculated (S730).

In this case, the sizes of length and width pixels of the real satellite image are information received together with the real satellite image, and the physical distance of one pixel may be calculated using the sizes of length and width pixels and accumulation of the real satellite image or using the number of pixels between two preselected points of the real satellite image and actual distance information between two points.

Then, a reference value for estimating each cell or position of the real satellite image is set. More specifically, a coordinate of a preselected reference position from the real satellite image is measured (S740). Here, the reference position may be selected by a map builder, and actual coordinate information in the reference position may be measured using a GPS mounted on the moving object to receive the outdoor map constructed according to the exemplary embodiment of the present invention.

In some situations, real coordinate information in a corresponding reference position is previously measured for each of kinds of GPS sensors, a GPS of the moving object is selected from the coordinate information on the corresponding reference position at the time of building the map, and the coordinate information on the selected GPS is extracted from the stored coordinate information for each of GPS sensors, thereby making it possible to obtain the coordinate information on the reference position.

When the pixel information is calculated and the coordinate information on the reference position is measured in operations (S730 and S740), the calculated and measured information is stored in a preset format and then be linked to the real satellite image, such that an outdoor map to be provided to the moving object is created (S750).

In this case, information linked to the outdoor map image includes a pixel number for the reference position. It is obvious to those skilled in the art that the pixel number for the reference position may be set based on the sizes of length and width pixels of the real satellite image and the information on the sizes.

The outdoor map for the moving object according to the exemplary embodiment of the present invention may include information on a road network in which the moving object actually navigates. A process of creating information on the road network of a real satellite image to include the information on a road network in an outdoor map will be described with reference to FIG. 8.

Figure 8:
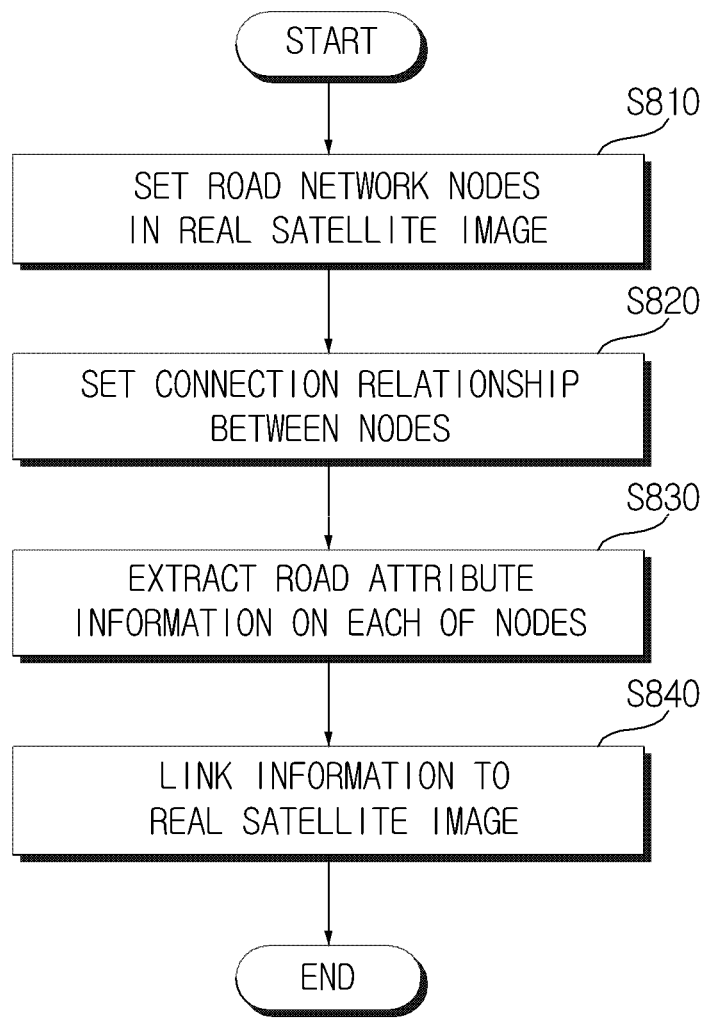
FIG. 8 is an operation flow chart showing a process of creating information on a road network in a method for building an outdoor map for a moving object according to an exemplary embodiment of the present invention.

FIG. 8 is an operation flow chart showing a process of creating information on a road network in a method for building an outdoor map for a moving object according to an exemplary embodiment of the present invention.

Referring to FIG. 8, a plurality of road network nodes from the real satellite image are set for creating information on a road network to which a moving object may navigate (S810).

In this case, the plurality of road network nodes may be directly selected and set on the real satellite image.

When the plurality of road network nodes are set, a connection relationship between the plurality of set road network nodes is set (S820).

In this case, the connection relationship between the plurality of road network nodes may be set by linking a plurality of node information connected to one node to each other. In setting the connection relationship between the nodes, the pixel information and the reference position information calculated and measured in FIG. 7 may be used.

Then, road attribute information on each of the plurality of set road network nodes is extracted (S830).

In this case, the road attribute information may include a kind of pavement, a width of road lane, and a kind of road lane. The kind and width of road lane may be extracted directly from the real satellite image.

After operations (S810 to S830) are performed, the set and extracted information on a road network is arranged in a preset format and then is linked to the real satellite image (S840).

These operations (S810 to S840) may be performed in parallel with each other after an operation (S740) shown in FIG. 7. The real satellite image is linked to the information calculated and measured by FIG. 7 and the information on the road network created by FIG. 8 to provide the information linked to the real satellite image of the corresponding region, thereby making it possible to allow the moving object to stably and reliably navigate using the outdoor map constructed at a low cost.

The methods for building an outdoor map for a moving object according to the exemplary embodiment of the present invention are implemented in a form of program commands capable of being performed through various computer components to thereby be recordable in a computer-readable recording media. The computer-readable recording media may include program commands, data files, data structures, or the like, alone or in combination. The program command recorded in the computer-readable recording media may be designed and constituted especially for the present invention, or may be known to those skilled in a field of computer software. Examples of the computer-readable recording media may include a magnetic media such as a hard disk, a floppy disk, and a magnetic tape; an optical recording media such as a CD-ROM and a DVD; a magneto-optical media such as a floptical disk; and a hardware device specially constituted to store and perform program commands such as a ROM, a RAM, a flash memory, or the like. Examples of the program commands may include machine language codes such as being made by compilers as well as high-level language codes capable of being executed by computers using interpreters, or the like. The hardware device may be constituted to be operated as one or more software modules in order to perform the action according to the exemplary embodiment of the present invention, and vice versa.

As described above, although the present invention is described by specific matters such as concrete components, and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scopes and spirits of the invention.

What is claimed is:

1. A method for building an outdoor map for a moving object, the method comprising:
   receiving a real satellite image for an outdoor space to which the moving object is to move, wherein the outdoor space is a final node in a plurality of nodes that create a road network that are linked;
   calculating pixel information including a length size and a width size of a group of pixels, as well as a physical distance of a one pixel in the real satellite image, wherein the physical distance of the one pixel is measured using the length size and the width size of the one pixel, as well as a scale, including a first number of pixels in a predetermined length, a second number of overall pixels, and a real length using the predetermined length on the image;
   measuring a reference position coordinate, using a single GPS in the moving object, for use as a reference position selected from the real satellite image; and
   linking a pixel number corresponding to the reference position, the reference position coordinate, and the pixel information, including the physical distance, a length size and a width size of a group of pixels, the scale, and the real length, to the real satellite image in order to build the outdoor map for the moving object.

2. The method of claim 1, further comprising creating information on the road network in which the moving object travels based on the pixel number corresponding to the reference position, the reference position coordinate, and the pixel information.

3. The method of claim 2, wherein the creating includes:
   setting a connection relationship between the plurality of set nodes;
   extracting road attribute information on each of the plurality of nodes; and
   linking information set or extracted for the plurality of nodes to the real satellite image.

4. The method of claim 1, wherein the receiving includes receiving the real satellite image converted into a raster image form or receiving a real satellite photograph, converting the real satellite photograph into the real satellite image in the raster image form, and providing the converted real satellite image, in order to reduce a data size of the constructed outdoor map.

5. The method of claim 1, wherein the calculating includes calculating the physical distance of one pixel using scale of the real satellite image and the sizes of the length and width pixels.

6. The method of claim 1, wherein the calculating includes calculating the physical distance of one pixel using physical distance information between two preselected points on the real satellite image and the number of pixels between the two points.

7. The method of claim 3, wherein the road attribute information includes a kind of pavement, a width of road lane, and a kind of road lane.

8. A computer-readable, non-transitory recording medium storing instructions that, when executed, cause one or more processors to:

receive a real satellite image for an outdoor space to which the moving object is to move, wherein the outdoor space is a final node in a plurality of nodes that create a road network that are linked;

calculate pixel information including a length size and a width size of a group of pixels, as well as a physical distance of a one pixel in the real satellite image, wherein the physical distance of the one pixel is measured using the length size and the width size of the one pixel, as well as a scale, including a first number of pixels in a predetermined length, a second number of overall pixels, and a real length using the predetermined length on the image;

measure a reference position coordinate, using a single GPS in the moving object, for use as a reference position selected from the real satellite image; and link a pixel number corresponding to the reference position, the reference position coordinate, and the pixel information, including the physical distance, a length size and a width size of a group of pixels, the scale, and the real length, to the real satellite image in order to build the outdoor map for the moving object.

9. An apparatus for building an outdoor map for a moving object, the apparatus comprising:

an image receiving unit receiving, via a computer device, a real satellite image for an outdoor space to which the moving object is to move, wherein the outdoor space is a final node in a plurality of nodes that are set by a road network information creating unit that is for creating a road network and a connection relationship between the plurality of nodes;

a pixel information calculating unit calculating, via the computer device, pixel information including a length size and a width size of a group of pixels, as well as a physical distance of a one pixel in the real satellite image, wherein the physical distance of the one pixel is is measured using the length size and the width size of the one pixel, as well as a scale, including a first number of pixels in a predetermined length, a second number of overall pixels, and a real length using the predetermined length on the image;

a reference position measuring unit measuring, via the computer device, a reference position coordinate, using a single GPS in the moving object, for use as a reference position selected from the real satellite image; and a link unit linking, via the computer device, a pixel number corresponding to the reference position, the reference position coordinate, and the pixel information, including the physical distance, a length size and a width size of a group of pixels, the scale, and the real length, to the real satellite image in order to build the outdoor map for the moving object.

10. The apparatus of claim 9, further comprising the road network information creating unit creating, via the computer device, information on the road network in which the moving object navigates based on the pixel number corresponding to the reference position, the reference position coordinate, and the pixel information.

11. The apparatus of claim 10,
wherein the road network information creating unit sets the plurality of nodes for extracting road attribute information on each of the plurality of nodes, and
the link unit links information set or extracted for the plurality of nodes to the real satellite image.

12. The apparatus of claim 9, wherein the image receiving unit receives the real satellite image converted into a raster image form or receives a real satellite photograph, converts the real satellite photograph into the real satellite image in the raster image form, and provides the converted real satellite image, in order to reduce a data size of the created outdoor map.

13. The apparatus of claim 9, wherein the pixel information calculating unit calculates the physical distance of one pixel using scale of the real satellite image and the sizes of the length and width pixels.

14. The apparatus of claim 9, wherein the pixel information calculating unit calculates the physical distance of one pixel using physical distance information between two preselected points on the real satellite image and the number of pixels between the two points.

15. The apparatus of claim 11, wherein the road attribute information includes a kind of pavement, a width of road lane, and a kind of road lane.

* * * * *